(12) United States Patent
Bittencourt (10) Patent No.: US 11,679,381 B2
(45) Date of Patent: Jun. 20, 2023

(54) METHODS FOR PREPARING HIGH TEMPERATURE WATER GAS SHIFTING CATALYST, CATALYST AND PROCESS FOR REDUCING CARBON MONOXIDE

(71) Applicant: PETRÓLEO BRASILEIRO S.A.—PETROBRÁS, Rio de Janeiro (BR)

(72) Inventor: Roberto Carlos Pontes Bittencourt, Rio de Janeiro (BR)

(73) Assignee: PETRÓLEO BRASILEIRO S.A.—PETROBRÁS, Rio De Janeiro (BR)

( * ) Notice: Subject to any disclaimer, the term of this patent is extended or adjusted under 35 U.S.C. 154(b) by 58 days.

(21) Appl. No.: 17/496,459

(22) Filed: Oct. 7, 2021

(65) Prior Publication Data
US 2022/0111377 A1    Apr. 14, 2022

(30) Foreign Application Priority Data
Oct. 8, 2020 (BR) ...................... 10 2020 020748 2

(51) Int. Cl.
*B01J 37/02* (2006.01)
*B01J 23/80* (2006.01)
(Continued)

(52) U.S. Cl.
CPC .......... *B01J 37/0207* (2013.01); *B01J 6/001* (2013.01); *B01J 23/80* (2013.01); *B01J 37/0209* (2013.01);
(Continued)

(58) Field of Classification Search
CPC ... B01J 6/001; B01J 21/04; B01J 23/72; B01J 23/755; B01J 23/78; B01J 23/80;
(Continued)

(56) References Cited

U.S. PATENT DOCUMENTS 4,861,745 A   8/1989 Huang et al.
6,500,403 B2  12/2002 Ward
(Continued)

FOREIGN PATENT DOCUMENTS

BR   PI 0915369-1 B1   9/2019
WO   WO 2017/134162 A1  8/2017

OTHER PUBLICATIONS

Machine translation of Lamberov (RU 2350594). (Year: 2009).*

*Primary Examiner* — Brian A McCaig
(74) *Attorney, Agent, or Firm* — Birch, Stewart, Kolasch & Birch, LLP (57) ABSTRACT

The present invention deals with catalysts for the conversion of CO by the shifting reaction of high temperature water gas, free from chromium and iron, consisting of alumina promoted by potassium, by zinc and copper oxides and in a second embodiment also additionally nickel. The catalysts thus prepared maintain high CO conversion activity, not having the environmental limitations or operating limitations with low excess steam in the process, which exist for catalysts in accordance with the state of the art. Such catalysts are used in the hydrogen or synthesis gas production process by the steam reforming of hydrocarbons, allow the use of low steam/carbon ratios in the process, exhibiting high activity and stability to thermal deactivation and lower environmental restrictions for production, storage, use and disposal, than the industrially used catalysts based on iron, chromium, and copper oxides.

12 Claims, 2 Drawing Sheets

(51) Int. Cl.
*B01J 6/00* (2006.01)
*C01B 3/16* (2006.01)
*B01J 21/04* (2006.01)

(52) U.S. Cl.
CPC .............. *B01J 37/0236* (2013.01); *C01B 3/16* (2013.01); *B01J 21/04* (2013.01); *C01B 2203/0283* (2013.01); *C01B 2203/1076* (2013.01); *C01B 2203/1082* (2013.01); *C01B 2203/1614* (2013.01); *C01B 2203/1628* (2013.01)

(58) Field of Classification Search
CPC ................ B01J 35/1014; B01J 35/1038; B01J 35/1061; B01J 37/0201; B01J 37/0205; B01J 37/0207; B01J 37/0209; B01J 37/0236; B01J 37/08; B01J 37/088; B01J 37/12; C01B 3/16; C01B 2203/0283; C01B 2203/1076; C01B 2203/1082; C01B 2203/1614; C01B 2203/1628
See application file for complete search history.

(56) References Cited

U.S. PATENT DOCUMENTS

| | | |
|---|---|---|
| 7,998,897 B2 | 8/2011 | Schiødt |
| 8,119,099 B2 | 2/2012 | Schiødt |

* cited by examiner

METHODS FOR PREPARING HIGH TEMPERATURE WATER GAS SHIFTING CATALYST, CATALYST AND PROCESS FOR REDUCING CARBON MONOXIDE

FIELD OF INVENTION

The present invention relates to a method of preparation of high temperature water gas shifting catalysts free of chromium and iron or noble metals, which are used in the process for converting carbon monoxide (CO) applied in production plants of $H_2$ in order to maintain the high CO conversion activity, not having the environmental or operational limitations with low excess steam in the process.

DESCRIPTION OF PRIOR ART

The water gas shift reaction ("water gas shift") is an integral step in the steam reforming process for the production of hydrogen. The reaction can be represented by equation 1, being exothermic and typically limited by thermodynamic equilibrium.

$$CO+H_2O=CO_2+H_2 \tag{eq.1}$$

The reaction produces $H_2$ and simultaneously reduces the level of CO, which is a contaminant for catalysts used in ammonia synthesis, hydrotreatment processes and for use in fuel cells, which make use of high purity hydrogen. In synthesis gas generation processes, the "water gas shift" reaction is used to adjust the desired proportion of CO and $H_2$. The "water gas shift" reaction is also part of other production processes of $H_2$, such as partial oxidation and autothermal reforming.

In the steam reforming process, the "water gas shift" reaction is conducted in a first stage, called "High Temperature Shift" (HTS), whose catalyst operates at typical temperatures between 330° C. at the inlet and up to 450° C. at the outlet of the reactor, followed by cooling of the effluent stream and additional reaction in a second stage, called "Low Temperature Shift" (LTS), which catalyst operates at typical temperatures between 180° C. at the inlet to 240° C. at the outlet of the reactor. In a variation of the process configuration, the LTS reactor and subsequent system of separating $CO_2$ by amines is replaced with the "pressure swing adsorption" (PSA) process. Pressure conditions are dictated by the use of hydrogen, typically the pressure of the process lies between 10 to 40 bar.

Commercial LTS catalysts consist of copper oxide, zinc oxide and alumina, with typical contents between 40 to 35% m/m; 27 to 44% m/m with alumina as balance, respectively. They may also contain minor amounts of alkaline promoters, such as cesium (Cs) or potassium (K). LTS catalysts quickly lose activity when exposed to high temperature, which is why they are used in the typical temperature range of 180° C. to 240° C., or in their "Medium Temperature Shift" (MTS) version at temperatures from 180° C. to 330° C. The lower temperature of the usage range is normally dictated by the requirement that no condensation of steam in the reactor occurs at the operating pressure of the unit.

The HTS catalyst used industrially in large plants, considered here as units having production greater than 50,000 $Nm^3/d$ of hydrogen, consists of iron (Fe), chromium (Cr) and copper (Cu), mostly in the form of oxides before the catalytic converter starts operating. Despite being widely used, the catalyst formulation has the disadvantage of containing chromium in its formulation. Particularly, during the calcination steps for manufacturing this catalyst, it is inevitable that variable levels of chromium are formed in the oxidation state VI ($CrO_3$ or $Cr^{6+}$), which compound has known carcinogenic effects and damage to the environment, being subject worldwide to increasing rigor of legislation. As an example, it worth mentioning the rules governing exposure to $Cr^{6+}$ in the workplace by OSHA (US Occupation Health and Safety Organization). The presence of $Cr^{6+}$ has negative impacts on the process of manufacturing, handling, transporting, loading, unloading and disposing of the material. Therefore, it is desirable to teach a chromium-free HTS catalyst in its formulation.

Literature reports several studies to replace chromium in the formulation of HTS catalyst with a composition based on iron, chromium and copper. A literature review reports studies on the replacement of chromium by various elements, such as oxides of cerium, silicon, titanium, magnesium, zirconium and aluminum, with aluminum being the most studied element in particular, according to reference by PAL, D. B. et al. "Performance of water gas shift reaction catalysts: A review", Renewable and Sustainable Energy Reviews, v. 93, p. 549-565, 2018. However, in industrial practice, an efficient substitute for chromium has not been found yet, which has the desired property of reducing the loss of surface area of the iron oxide phases present in the catalyst at the usual process temperatures and consequently reduces the deactivation rate of material.

Another unfavorable characteristic of the current formulation of HTS catalysts is the presence of iron oxides in the composition thereof, which typically make up 80 to 90% m/m of the catalyst. The iron oxide present in the HTS catalyst is mainly in the form of hematite ($Fe_2O_3$), in addition to minor contents of other iron hydroxides. After being loaded into the reactor, the catalyst is subjected to an activation procedure, which reduces the hematite phase ($Fe_2O_3$) to magnetite phase ($Fe_3O_4$), which in turn constitutes the active phase of the catalyst. Simultaneously, during the reduction the CuO phases are reduced to metallic copper. The reactions are exemplified below:

$$3Fe_2O_3+H_2=2Fe_3O_4+H_2O$$

$$CuO+H_2=Cu+H_2O \tag{eq.2}$$

The activation procedure has to be carefully carried out, such that the excessive reduction of the iron oxide phases does not occur, which could then form the undesirable phases of FeO or even metallic Fe, leading to several problems, such as reduced activity, catalyst disintegration with increased load loss in the reactor and formation of by-products by the "Fischer-Tropsch" reaction or by the methanation reaction. Thus, it would be desirable from an industrial point of view, an HTS catalyst that does not require the reduction procedure or even could be heated with a gas containing high levels of $H_2$ but free from moisture.

Another teaching that is desirable is to provide an HTS catalyst that can reduce the excess steam used in the production process by steam reforming, which includes the "shift" reaction (eq.1). The reduction of excess steam allows the production of hydrogen having greater energy efficiency and lower emissions of $CO_2$, a gas known for its impact on global warming. However, the literature teaches that HTS catalysts containing iron oxide in their formulation cannot be used with a low excess steam in the process. The reason is that once the active phase of $Fe_3O_4$ is formed its stability under industrial conditions will depend on the relationship between the oxidizing and reducing components present in the reactor feed, particularly the ratios $H_2O/H_2$ and $CO_2/CO$. The literature teaches that when the steam content in the process is reduced below a certain value, typically below 2.8 mol/mol, as usually expressed by the steam/carbon ratio in the previous step of reforming, the iron oxide phases become undesirable phases of iron carbide type. The iron carbide phases, in turn, catalyze the formation of by-products such as hydrocarbons, alcohols and other compounds, which reduce the hydrogen yield and bring additional difficulties in purifying the hydrogen produced and the steam condensed in the process. Thus, teaching an HTS catalyst free of iron in its composition is desirable.

A solution taught in U.S. Pat. No. 6,500,403 to reduce excess steam in the $H_2$ production process by steam reforming would be to carry out the water gas shift reaction ("water gas shift") in a first step, at temperatures between 280° C. to 370° C., using an iron-free and copper-based catalyst on a support, thus reducing the ratio $CO/CO_2$ in the inlet of second step, which would be carried out on a conventional Fe/Cr catalyst, at the typical temperature of 350° C. to 500° C. This solution, however, adds high additional costs to the steam reforming process, as it includes an additional CO abatement step, or load cooling steps followed by heating, which brings energy losses and/or greater complexity to the process.

A more practical solution for preventing the formation of iron carbide phases in the HTS catalyst is taught in U.S. Pat. No. 4,861,745. This patent describes the addition of copper oxide to the HTS catalyst formulation, consisting of iron and chromium oxides. In accordance with this teaching, commercial HTS catalysts used in large-scale production plants of $H_2$ are made of iron, chromium and copper oxides. However, this solution can only be used up to a minimum value of vapor/carbon ratio around 2.8 mol/mol. Thus, steam is still used in large excess in relation to the stoichiometry of the shift reaction (eq.1), which brings the undesirable effect of a high energy consumption in the process, in addition to greater $CO_2$ emissions due to burning fuel to provide the energy needed to heat the excess steam.

Another solution taught in the literature to produce an iron-free HTS catalyst in its formulation is the use of noble metals. RATNASAMY, C.; Wagner, J. P. "Water gas shift catalysis", Catalysis Reviews, V. 51, p. 325-440, 2009 reviews the literature and teaches the use of platinum (Pt) deposited in several oxides, such as zirconium, vanadium, alumina, and cerium oxides. These catalysts are sometimes used in fuel cell systems, however, they have limited utility in large plants for production of $H_2$, due to the high cost and reduced availability of noble metals. Another negative factor is that these catalysts are much more sensitive to the presence of poisons in the reactor feed, such as chlorides or sulfur, than traditional HTS catalysts based on iron, chromium, and copper oxides.

Documents U.S. Pat. Nos. 7,998,897, 8,119,099 and WO2017/134162A1 teach an HTS catalyst free from Fe and Cr in their formulation. The catalyst is a mixture of zinc aluminate ($ZnAl_2O_4$) and zinc oxide (ZnO), with a Zn/Al molar ratio between 0.5 to 1.0, in combination with alkali metals selected from the group consisting of Na, K, Rb, Cs and mixtures thereof, in a content between 0.4 to 8.0% m/m, based on the oxidized material. In a specific teaching of U.S. Pat. No. 7,998,897, the catalyst has a Zn/Al ratio of 0.7 mol/mol, a Zn content between 34 to 36% m/m and a cesium content between 7 to 8% m/m. In another teaching (Examples 30 and 31), U.S. Pat. No. 7,998,897 shows that the promotion of the catalyst with copper allows obtaining a material with greater initial activity. However, the promoting effect does not last due to the loss of activity with operating time. As copper is a relatively expensive element, it was then excluded from the taught formulation of the catalyst.

Therefore, it is desirable to provide an HTS catalyst that is free from chromium (Cr), an element that is dangerous to health and the environment, free of iron (Fe) so that a reduced excess of steam can be used in the process with gains in energy efficiency, but which has high activity and stability under the conditions of the steam reforming process, thus allowing replacement of current HTS catalysts in existing units.

Patent PI0915369B1 discloses an improved process for the production of hydrogen reacting carbonaceous resources with steam and/or oxygen. In particular, the invention provides a method for carrying out the high water gas shift reaction in a synthesis gas having a reduced vapor content. This study also cites the use of a catalyst containing zinc and aluminum oxides together with one or more promoters in a high temperature reactor (HTS). Promoters are selected from Na, K, Rb, Cs, Cu, Ti, Zr. However, it does not mention the use of nickel in the formulation of its catalyst.

Thus, although there are teachings in the literature of "High Temperature Shift" (or HTS) catalysts free from chromium and iron, there is still a need for a catalyst that has high activity and stability under reaction conditions; such is the purpose of present invention.

In order to solve such problems, the present invention was developed providing HTS catalysts, free from chromium, iron, and noble metals, which have high activity and resistance to thermal deactivation, that is, maintaining their activity for long periods, even when exposed to high process temperatures.

The reduction of excess steam in the process for converting CO, expressed by the steam/gas or steam/carbon ratio, is only possible using iron-free HTS catalysts, such as those obtained in the present invention. Furthermore, the elimination of chromium from the catalyst formulation, especially in its form of $Cr^{6+}$ which is carcinogenic, reduces risks during the steps of handling, loading, and unloading the catalyst.

Furthermore, the use of an HTS catalyst tolerant to low steam/gas ratios reduces the risk of occurring abnormalities in the process, which could lead to the increase in pressure drop and/or formation of by-products in the reactor. Thus, the reduction of the steam/carbon ratio in the steam reforming process for the production of $H_2$ also contributes to the reduction of $CO_2$ in the process, which typically can vary between 8 to 12 tons of $CO_2$/ton $H_2$.

BRIEF DESCRIPTION OF THE INVENTION

The present invention deals with catalysts for the conversion of CO by the shifting reaction of high temperature water gas (HTS), free from chromium and iron, consisting of alumina promoted by potassium, by zinc and copper oxides and in a second embodiment preferably additionally containing nickel. The catalysts thus prepared maintain high CO conversion activity, not having the environmental limitations or operating limitations with low excess steam in the process, which exist for catalysts in accordance with the state of the art.

Such catalysts are used in the hydrogen or synthesis gas production process by the steam reforming of hydrocarbons, allowing the use of low steam/carbon ratios in the process, exhibiting high activity and stability to thermal deactivation and having lower environmental restrictions for production, storage, use and disposal, than the industrially used catalysts based on iron, chromium, and copper oxides.

BRIEF DESCRIPTION OF THE DRAWINGS

The present invention will be described in more detail below, with reference to the attached figures which, in a schematic and non-limiting way, represent examples of the configuration thereof. In the drawings, there are.

DETAILED DESCRIPTION OF THE INVENTION

The present invention deals with catalysts applicable to the water gas shifting step of the steam reforming process for the production of hydrogen. Such catalysts are constituted by a support of the alumina type promoted by potassium. The catalyst exhibits a specific area greater than 60 $m^2/g$, a potassium content between 4 to 15% m/m, preferably between 3 to 10% m/m, a zinc oxide content between 5 to 30% m/m, preferably between 8 to 20% m/m, a copper oxide content between 1 to 4% m/m, preferably between 2 to 3% m/m, a Zn/Al molar ratio less than 0.4, preferably smaller 0.3 and an atomic Cu/Ni ratio between 6 to 12, preferably between 9 to 11, based on the oxidized material, being obtained by the preparation method comprising the following steps.

1. Impregnation of an alumina, selected from boehmite, gamma or theta-alumina with an aqueous solution of a potassium salt, preferably hydroxide, carbonate or nitrate, followed by drying and calcination at temperatures between 400° C. to 800° C., to obtain an alumina promoted with potassium;
2. Impregnation of the alumina-type support promoted with potassium with a polar solution, preferably aqueous, containing a zinc salt, preferably nitrate or carbonate, and a copper salt, preferably nitrate or acetate, followed by drying at temperatures between 80° C. to 120° C., formatting into pellets and calcining at temperatures between 300° C. to 500° C., preferably 450° C.
3. Optionally, the material obtained in item 2 can be impregnated with a polar solution, preferably aqueous, of a soluble nickel salt, preferably nitrate or acetate, followed by drying at temperatures between 80° C. to 120° C.

The term potassium-promoted alumina, as used in the present invention, refers to an alumina containing potassium species on its surface, which may, depending on the calcination temperature, preferably exhibit X-ray diffraction technique, crystalline structures of aluminum and potassium oxide, such as the form $K_2O \cdot Al_2O_3$ (CAS 12003-62-3).

Alternatively, step 1 does not need to be carried out, and commercial potassium aluminates can be used, as long as they have specific surface area greater than 15 $m^2/g$, preferably greater than 40 $m^2/g$. It is also advantageous to use promoted aluminas for greater resistance to loss of specific surface area by the action of steam, such as aluminas promoted by lanthanum.

Alternatively, the material obtained in item 3 can be calcined in air at temperatures between 350° C. and 450° C., to avoid the release in the steam reforming process, during the entry into operation of the material of condensable gases with acidic properties.

The formatting step can be carried out by commercial machines, obtaining inserts, preferably with typical dimensions of 3 to 6 mm in diameter and height. Other formats can also be used, such as single cylinder or multiple connected cylinders (trilobe, quadralobe) or raschig rings. Alternatively, it can be used in step 1 an alumina such as gamma or theta-alumina already pre-formatted.

In an alternative form, the alumina support is simultaneously impregnated with a potassium salt, preferably potassium hydroxide or nitrate; a zinc salt, preferably zinc nitrate or carbonate; a copper salt, preferably copper nitrate or acetate and a nickel salt, preferably nickel nitrate and acetate, in a polar solution, preferably aqueous, followed by drying at temperatures between 80° C. to 120° C., and calcination at temperatures between 300° C. to 500° C.

Although it is advantageous from the point of view of increasing the CO conversion activity in the water gas shifting reaction to use copper oxide contents above 4% m/m in the catalyst formulation, such contents bringing a significant temperature increase in the reactor during the start-up of the catalyst in the steam reforming process, due to the reduction of the copper oxide phase to metallic copper. Such temperature increase is undesirable because it can cause an early loss of performance of catalyst due to exposure to high temperatures, as well as reach values above the metallurgical limits of the reactor. Optionally, when conditions exist in the industrial plant to carry out the controlled reduction of the copper oxide phases, then copper oxide contents above 3% m/m can be used.

The catalyst thus prepared is active, stable and ready to use, not requiring any additional activation procedure, and can be used in the conversion reaction of CO with water vapor to produce hydrogen, at reactor inlet temperatures between 280° C. to 400° C., preferably at temperatures between 300° C. to 350° C. and reactor outlet between 380° C. to 500° C., preferably between 400° C. to 450° C. The operating pressure in the reactor can be in the range from 10 to 40 $kgf/cm^2$, preferably between 20 to 30 $kgf/cm^2$. The vapor/dry gas molar ratio at the reactor inlet is preferably in the range of 0.05 to 0.6 mol/mol, more preferably in the range of 0.1 to 0.3 mol/mol. Similarly, the steam/carbon ratio (mol/mol) at the inlet of the primary steam reforming reactor, which precedes the high temperature water gas shifting reactor (HTS) is preferably in the range of 1 to 5 mol/mol, more preferably in the range of 1.5 to 2.5 mol/mol. The composition of the dry gas at the reactor inlet can typically contain CO contents between 5 to 30% v/v, preferably between 8 to 20% v/v.

A second aspect of the present invention is to provide an HTS catalyst that can be used with low excess steam, equivalent to a steam/gas ratio at the inlet of the HTS reactor or steam/carbon at the inlet of the steam reforming reactor, positioned downstream the HTS reactor, without formation of by-products or increase in pressure drop due to the occurrence of phase transformations of the material.

In the second aspect of the present invention, it is advantageous to use the catalyst consisting of alumina containing potassium, and zinc and copper oxides promoted by nickel, in the upper region of the fixed bed reactor and downward flow, more appropriately in the region comprised between 0 and 40% v/v in order to make use of its greater activity and reduce the risk of occurrence of methanation reactions with aging of the catalyst and at the bottom of the reactor the catalyst consisting of alumina containing potassium, and zinc and copper oxides.

In a third aspect of the present invention is to provide a process for converting carbon monoxide by contacting said catalyst with a stream of synthesis gas at temperatures between 250° C. to 450° C., steam/gas between 0.2 to 1.0 mol/mol and pressures between 10 to 40 atm.

In accordance with the first aspect of the invention there is taught a catalyst for use in the high temperature water gas shifting reaction (HTS) consisting of alumina containing potassium, zinc, copper and nickel species.

EXAMPLES

The examples presented below are intended to illustrate some ways of implementing the invention, as well as to prove the practical feasibility of its application, not constituting any form of limitation of the invention.

Example 1

This comparative example illustrates the preparation of a catalyst, in accordance with the state of the art, of high temperature water gas shifting (HTS) of the zinc aluminate type promoted by alkali metals. Initially, an aqueous solution containing 311 grams of demineralized water ($H_2O$), 415 grams of aluminum nitrate ($Al(NO_3)_3 \cdot 9H_2O$, (Albrand VETEC, PA) in a nominal Zn/Al ratio of 0.5 mol/mol was prepared by dissolving and stirring at room temperature.

Then, the solution was bulked with demineralized water to 830 ml and exhibited pH of 1.04. On top of this solution, an ammonium hydroxide solution ($NH_4OH$, 28% w/w, VETEC) was added at room temperature, in 30 minutes and with stirring at 300 rpm, until the pH of the stirred mixture was between 8.0 to 8.5. The mixture was kept under stirring for 1 hour and then filtered and washed with demineralized water. The precipitated material was then dried at 110° C. for 1 night and then calcined in static air at a temperature of 750° C. for 3 hours.

Figure 1:
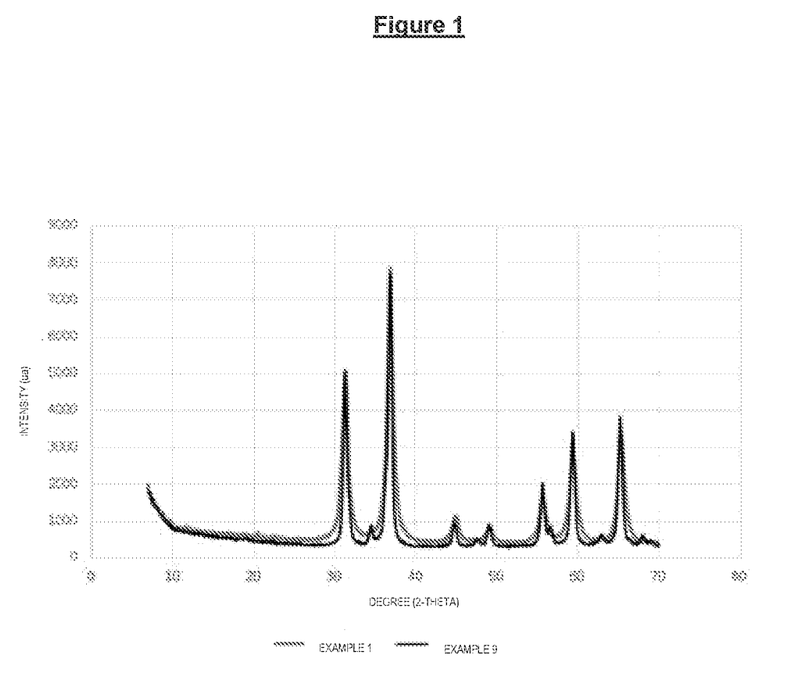
FIG. 1 illustrating an X-ray diffraction (XRD) graph of the solids obtained in accordance with Examples 1 and 9.

The material characterizations exhibited by the $N_2$ adsorption technic (Brunauer-Emmett-Teller—BET method) a specific area of 65 m$^2$/g, pore volume of 0.23 cm$^3$/g and average pore diameter of 144 A; and by the X-ray diffraction technique (XRD, Cu—K radiation, 40 kV, 40 mA) the characteristic zinc aluminate pattern (JCPDS Card No 05-0669), as shown in FIG. 1.

Example 2

This comparative example in accordance with the state of the art illustrates the preparation of a catalyst of high temperature water gas shifting (HTS) of the zinc aluminate type promoted by alkali metals. Ten grams of the material produced in EXAMPLE 1 were impregnated by the pore volume technique with 6.1 ml of an aqueous solution containing 0.145 grams of potassium hydroxide (VETEC). The material was dried at 100° C. for 1 hour and then calcined at 500° C. for 2 hours in order to obtain a zinc aluminate type catalyst promoted with 1% m/m of potassium. The product presented by the technique of adsorption of $N_2$ a specific area of 60.7 m$^2$/g, pore volume of 0.24 cm$^3$/g and average pore diameter of 144.6 A.

Example 3

This comparative example in accordance with the state of the art illustrates the preparation of a catalyst of high temperature water gas shifting (HTS) of the zinc aluminate type promoted by alkali metals. The preparation was identical to that used in EXAMPLE 2, the potassium hydroxide content being varied so as to have a nominal content of 2% m/m of potassium. The product presented by the technique of adsorption of $N_2$ a specific area of 60.0 m$^2$/g, pore volume of 0.24 cm$^3$/g and average pore diameter of 143 A.

Example 4

This comparative example in accordance with the state of the art illustrates the preparation of a catalyst of high temperature water gas shifting (HTS) of the zinc aluminate type promoted by alkali metals. The preparation was identical to that used in EXAMPLE 2, the potassium hydroxide content being varied so as to have a nominal content of 4% m/m of potassium. The product presented by the technique of adsorption of $N_2$ a specific area of 52 m$^2$/g, pore volume of 0.22 cm$^3$/g and average pore diameter of 151 A.

Example 5

This comparative example in accordance with the state of the art illustrates the preparation of a catalyst of high temperature water gas shifting (HTS) of the zinc aluminate type promoted by alkali metals. The preparation was identical to that used in EXAMPLE 2, the potassium hydroxide content being varied so as to have a nominal content of 8% m/m of potassium. The product presented by the technique of adsorption of $N_2$ a specific area of 42 m$^2$/g, pore volume of 0.19 cm$^3$/g and average pore diameter of 181 A.

Example 6

This comparative example in accordance with the state of the art illustrates the preparation of a catalyst of high temperature water gas shifting (HTS) of the zinc aluminate type promoted by alkali metals. The preparation was identical to that used in EXAMPLE 2, changing the source of potassium to potassium carbonate ($K_2CO_3$) in order to have a nominal content of 4% m/m of potassium. The product presented by the technique of adsorption of $N_2$ a specific area of 39 m$^2$/g, pore volume of 0.18 cm$^3$/g and average pore diameter of 188 A.

Example 7

This comparative example illustrates the preparation of a catalyst of high temperature water gas shifting (HTS) of the zinc aluminate type promoted by alkali metals, and in accordance with the state of the art. The material was prepared in a similar way to EXAMPLE 1, except that the ratios of the reactants were changed in order to have a Zn/Al ratio of 0.70 mol/mol.

The material characterizations exhibited a) by the $N_2$ adsorption technique a specific area of 22 m$^2$/g, pore volume of 0.12 cm$^3$/g and average pore diameter of 235; b) by the technique without quantitative X-ray Fluorescence (FRX) a composition containing 25% m/m of Al and 40% m/m of Zn, with the oxygen balance and the technique of X-ray diffraction (XRD) as the standard characteristic of zinc aluminate, as shown in FIG. 1.

Example 8

This comparative example in accordance with the state of the art illustrates the preparation of a catalyst of high temperature water gas shifting (HTS) of the zinc aluminate type promoted by alkali metals. Ten grams of the material produced in EXAMPLE 7 were impregnated by the pore volume technique with 4.0 ml of an aqueous solution containing 0.598 grams of potassium hydroxide (VETEC). The material was dried at 100° C. for 1 hour and then calcined at 500° C. for 2 hours in order to obtain a zinc aluminate type catalyst promoted with 4% m/m of potassium. The product presented by the technique of adsorption of $N_2$ a specific area of 16.7 $m^2/g$, pore volume of 0.10 $cm^3/g$ and average pore diameter of 173 A.

Example 9

This comparative example in accordance with the state of the art illustrates the preparation of a catalyst of high temperature water gas shifting (HTS) of the zinc aluminate type promoted by alkali metals. The preparation was identical to that used in EXAMPLE 8, the potassium hydroxide content being varied so as to have a nominal content of 8% m/m of potassium. The product presented by the technique of adsorption of $N_2$ a specific area of 17.5 $m^2/g$, pore volume of 0.08 $cm^3/g$ and average pore diameter of 176 A.

Example 10

Figure 2:
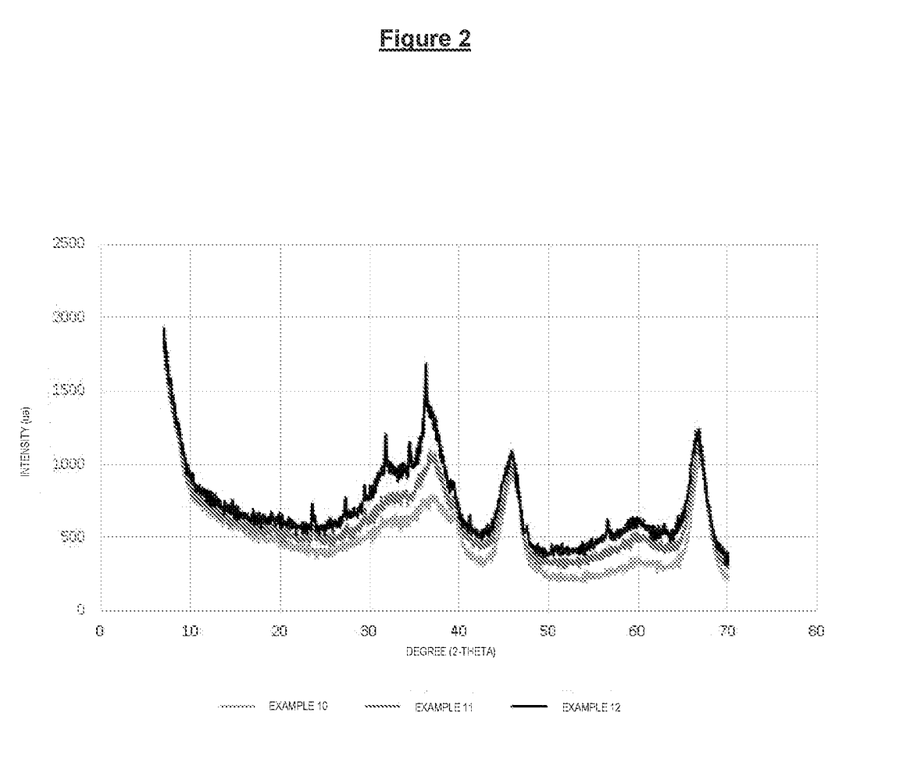
FIG. 2 illustrating an X-ray diffraction (XRD) graph of solids obtained in accordance with Examples 10, 11 and 12.

This example illustrates the preparation of a high temperature water gas shifting (HTS) catalyst of the alumina type promoted with potassium and zinc oxide in accordance with the present invention. One hundred grams of a commercial alumina hydroxide (boehmite, CATAPAL, SASOL) were impregnated by the wet point method with a 70 ml aqueous solution containing 11.5 grams of potassium hydroxide (VETEC). The following material was dried at 100° C. for 1 night and calcined in static air at a temperature of 600° C. for 2 hours to obtain a SUPPORT of the alumina type promoted with potassium, as shown in FIG. 2. The material had a specific area of 111 $m^2/g$ and pore volume of 0.27 $cm^3/g$ by the nitrogen adsorption technique (BET).

Fifteen grams of the support thus obtained were impregnated using the wet spot technique with 9.3 ml of aqueous solution containing 6.09 grams of zinc nitrate (Zn$(NO_3)_2 \cdot 6H_2O$, Merck) and then dried at 100° C. for 1 night and calcined in static air at a temperature of 400° C. for 2 hours, to obtain a material having a nominal content of 8.0 m/m of Zn (the semiquantitative analysis by the X-ray fluorescence technique showed a content of 7.1% m/m), a specific area of 89.5 $m^2/g$ and a pore volume of 0.21 $cm^3/g$ and without observing the significant presence of crystalline zinc aluminate by the X-ray diffraction technique, as illustrated in FIG. 2.

Example 11

This example illustrates the preparation of a high temperature water gas shifting (HTS) catalyst of the alumina type promoted with potassium, and zinc and copper oxide, and in accordance with the present invention. One hundred grams of a commercial alumina hydroxide (boehmite, CATAPAL, SASOL) were impregnated by the wet point method with a 70 ml aqueous solution containing 11.5 grams of potassium hydroxide (VETEC). The following material was dried at 100° C. for 1 night and calcined in static air at a temperature of 600° C. for 2 hours to obtain a SUPPORT of the alumina type promoted with potassium, as shown in FIG. 2. The material had a specific area of 111 $m^2/g$ and pore volume of 0.27 $cm^3/g$ by the nitrogen adsorption technique (BET).

Fifteen grams of the support thus obtained were impregnated using the wet spot technique with 9.3 ml of aqueous solution containing 6.30 grams of zinc nitrate (Zn$(NO_3)_2 \cdot 6H_2O$, Merck) and 1.57 grams of copper nitrate (Cu$(NO_3)_2 \cdot 3H_2O$, VETEC) and then dried at 100° C. for 1 night and calcined in static air at a temperature of 400° C. for 2 hours to obtain a material containing nominally 10% ZnO and 3.0% CuO (a semiquantitative analysis by X-ray fluorescence resulted in 3.6% K, 7.3% m/m Zn and 2.4% m/m Cu). The catalyst had a specific surface area of 88.3 $m^2/g$ and pore volume of 0.21 $cm^3/g$.

Example 12

This comparative example illustrates the preparation of a high temperature water gas shifting catalyst (HTS) of the alumina type containing potassium, zinc and copper oxides, and promoted by nickel salts and in accordance with present invention. The material was prepared according to EXAMPLE 11 and then impregnated by the wet point method with an aqueous solution of nickel nitrate (Ni$(NO_3)_2 \cdot 6H_2O$) in order to obtain an atomic Cu/Ni ratio of 10 atg/atg. A part of the material was only dried at 100° C. for 1 night to obtain the catalyst identified as EXAMPLE 12-S and another portion was calcined at the temperature of 400° C. for 2 hours to obtain the catalyst identified as EXAMPLE 12-C.

Example 13

This example describes the measure of catalytic activity of the catalysts obtained according to EXAMPLES 1 TO 12. The shift reaction was carried out in a fixed bed reactor, at atmospheric pressure. The sample was initially heated in argon flow up to 100° C. and then up to 350° C., at a rate of 5° C./min in a flow of 5% $H_2$ in argon saturated with water vapor at 73° C. After this pre-treatment, the gas mixture was replaced by a mixture containing 10% CO, 10% $CO_2$, 2% methane in balance of $H_2$, keeping the temperature of the saturator with water at 73° C., corresponding to a ratio steam/gas of 0.55 mol/mol. The reaction was carried out at temperatures from 350° C. to 450° C. with the reactor effluent being analyzed by gas chromatography. Catalyst activity was expressed as CO conversion (% v/v).

The results are shown in Table 1 and allow to conclude that: a) the catalyst based on alumina containing potassium and zinc oxide, in accordance with the present invention, (EXAMPLE 10) has CO conversion activity by the water gas shifting reaction greater than materials prepared in accordance with the state of the art (EXAMPLES 1 to 9); b) the addition of a low copper content to the alumina-type catalyst containing potassium and zinc oxide and in accordance with the present invention (EXAMPLE 11) allows to obtain a significant increase in the CO conversion activity, the performance being greater than that observed for a commercial HTS catalyst consisting of iron, chromium and copper oxides.

TABLE 1

Activity in the water gas shifting reaction (XCO) of HTS catalysts prepared in accordance with the state of the art and in accordance with the present invention.

| | | | | | | | Temperature (° C.) | | | | |
|---|---|---|---|---|---|---|---|---|---|---|---|
| | | | | | | | 350 | 370 | 390 | 420 | 450 |
| | | | | | | catalyst | | | | | |
| | Zn/Al mol/mol | Area $m^2/g$ | K % m/m | Zn % m/m | Cu % m/m | Ni % m/m | X CO % v/v | X CO % v/v | X CO % v/v | X CO % v/v | X CO % v/v |
| EXAMPLE 1 | 0.5 | 65.0 | 0.0 | 35.6 | 0.0 | 0.0 | 0.3 | 0.5 | 0.5 | 1.4 | 2.3 |
| EXAMPLE 2 | 0.5 | 60.7 | 1.0 | 35.2 | 0.0 | 0.0 | 0.2 | 1.4 | 1.9 | 3.1 | 3.5 |
| EXAMPLE 3 | 0.5 | 60.0 | 2.0 | 34.9 | 0.0 | 0.0 | 3.1 | 4.5 | 6.3 | 9.9 | 12.7 |
| EXAMPLE 4 | 0.5 | 52.0 | 4.0 | 34.2 | 0.0 | 0.0 | 4.5 | 6.4 | 9.7 | 16.0 | 22.9 |
| EXAMPLE 5 | 0.5 | 42.0 | 8.0 | 33.0 | 0.0 | 0.0 | 3.5 | 6.2 | 9.8 | 16.3 | 23.1 |
| EXAMPLE 6 | 0.5 | 39.0 | 4.0 | 34.2 | 0.0 | 0.0 | 3.2 | 6.1 | 9.2 | 15.8 | 23.3 |
| EXAMPLE 7 | 0.7 | 22.0 | 0.0 | 42.1 | 0.0 | 0.0 | 0.1 | 0.3 | 0.4 | 1.0 | 1.5 |
| EXAMPLE 8 | 0.7 | 16.7 | 4.0 | 40.5 | 0.0 | 0.0 | 3.1 | 5.7 | 9.7 | 17.0 | 27.2 |
| EXAMPLE 9 | 0.7 | 17.5 | 8.0 | 39.0 | 0.0 | 0.0 | 2.1 | 3.9 | 7.6 | 14.1 | 21.6 |
| EXAMPLE 10 | 0.1 | 111.0 | 9.0 | 8.0 | 0.0 | 0.0 | 1.4 | 2.0 | 16.2 | 26.6 | 29.6 |
| EXAMPLE 11 | 0.1 | 89.5 | 8.7 | 7.0 | 2.4 | 0.0 | 40.0 | 49.8 | 54.7 | 60.1 | 59.0 |
| commercial | — | n.a. | 0 | 0 | | 0 | 25.5 | | | | |

Note:
Commercial HTS catalyst consisting of iron and chromium oxides promoted by copper oxide.

Example 14

This example describes the thermal deactivation resistance of the catalysts obtained in accordance with EXAMPLES 1 to 12. The shift reaction was carried out in a fixed bed reactor, at atmospheric pressure. The sample was initially heated in argon flow up to 100° C. and then up to 350° C., at a rate of 5° C./min in a flow of 5% $H_2$ in argon saturated with water vapor at 73° C. After this pre-treatment, the gas mixture was replaced by a mixture containing 10% CO, 10% $CO_2$, 2% methane in balance of $H_2$, keeping the temperature of the saturator with water at 73° C., corresponding to a ratio steam/gas of 0.55 mol/mol. The reaction was carried out at temperatures of 350° C. (X1) and then a first deactivation cycle was carried out exposing the catalyst to a flow of $H_2$/vapor for 6 hours at 500° C. Next, the second measurement of the CO conversion activity at 350° C. (X2) was performed as previously performed. The deactivation and reaction cycle was repeated and the activity at 350° C. was measured a third time (X3). The activity of catalyst was expressed as CO conversion (% v/v).

to retain activity much greater than the commercial catalyst taken as reference and based on iron, chromium and copper oxides, when exposed to accelerated deactivation methodology by exposure to elevated temperatures. Promotion with nickel salt without carrying out the calcination step (EXAMPLE 12-S) allows to obtain the best results, but the material containing nickel and subjected to calcination (EXAMPLE 12-C) can be advantageous considering aspects of transport, storage and activation in the industrial plant. The presence of nickel in the formulation with a Cu/Ni ratio close to 10 also allowed to obtain an increase in activity and resistance to deactivation by exposure to high temperatures, without observing in the conditions of the experiments the formation of methane contents from the reaction reactions. The catalyst, therefore, demonstrates to be suitable for industrial use and, due to its high activity, allows the use of reactor inlet temperatures lower than those currently practiced with conventional HTS catalysts based on iron, chromium and copper oxides, with potential advantage of greater energy efficiency in the steam reforming process and longer catalyst campaign time.

TABLE 2

Activity in the water gas shifting reaction (XCO) of the HTS catalysts prepared in accordance with the present invention.

| | | | | | | | X1 (350° C.) | X2 (350° C.) | X3 (350° C.) |
|---|---|---|---|---|---|---|---|---|---|
| | | | | | | catalyst | | | |
| | Zn/Al mol/mol | Area $m^2/g$ | K % m/m | Zn % m/m | Cu % m/m | Ni % m/m | X CO % v/v | X CO % v/v | X CO % v/v |
| EXAMPLE 11 | 0.1 | 89.5 | 8.7 | 7.0 | 2.4 | 0.0 | 34.2 | 20.3 | 13.9 |
| EXAMPLE 12-S | 0.1 | 87.6 | 8.7 | 7.0 | 2.4 | 0.2 | 57.7 | 30.3 | 22.1 |
| EXAMPLE 12-C | 0.1 | 88.4 | 8.7 | 7.0 | 2.4 | 0.2 | 45.4 | 24.5 | 18.1 |
| commercial | — | n.a. | 0 | 0 | | 0 | 25.5 | 6.2 | 5.0 |

Note:
Commercial HTS catalyst consisting of iron and chromium oxides promoted by copper oxide.

The results in Table 2 show that the catalysts according to present invention (EXAMPLES 11, 12-S and 12-C) are able It should be noted that, although the present invention has been described with respect to the attached drawings, modifications and adaptations can be made by those skilled in the art, depending on the specific situation, but provided that it is within the inventive scope defined herein.

The invention claimed is:

1. Method for preparing a water gas shift reaction catalyst, free of iron or chromium, comprising:
    a) Impregnating an alumina support with an aqueous solution of a potassium salt;
    b) Drying the support to remove the solvent and calcine the alumina support at temperatures between 400° C. and 800° C. to obtain a potassium promoted alumina, preferably forming potassium aluminate species;
    c) Impregnating the potassium promoted alumina with an aqueous polar solution containing a soluble zinc salt and a soluble copper salt;
    d) Drying at a temperature between 80° C. and 120° C., and calcining the material at temperatures between 300° C. and 500° C., to obtain a catalyst consisting of alumina promoted with potassium and containing zinc and copper oxides;
    e) Impregnating the material obtained in step (d) with an aqueous solution of a nickel salt, drying at a temperature between 80° C. and 120° C., optionally calcining between 350° C. to 450° C., to obtain a catalyst consisting of alumina promoted with potassium and containing zinc and copper oxides promoted by nickel.

2. Method, according to claim 1, wherein the alumina is selected from boehmite, gamma, theta-alumina or alumina promoted with lanthanum.

3. Method, according to claim 1, wherein the potassium salt is selected from hydroxide, nitrate or carbonate, the zinc salt is nitrate or carbonate and the copper and nickel salts are nitrates or acetates.

4. Method, according to claim 1, wherein the alumina support is simultaneously impregnated with potassium salt, zinc salt, copper salt and nickel salt in a polar aqueous solution, followed by drying at temperatures between 80° C. to 120° C., and calcination at temperatures between 300° C. to 500° C.

5. Catalysts, as obtained by the method defined in claim 4, wherein having a specific area greater than 60 $m^2/g$, a potassium content between 4 to 15% m/m, zinc oxide content between 5 to 30% m/m, copper oxide content between 1 to 4% w/w, a Zn/Al molar ratio less than 0.4 and an atomic Cu/Ni ratio between 6 to 12, based on the weight of the catalyst.

6. Catalysts, as obtained by the method defined in claim 1, wherein having a specific area greater than 60 $m^2/g$, a potassium content between 4 to 15% m/m, zinc oxide content between 5 to 30% m/m, copper oxide content between 1 to 4% w/w, a Zn/Al molar ratio less than 0.4 and an atomic Cu/Ni ratio between 6 to 12, based on the weight of the catalyst.

7. Process for reducing carbon monoxide, by the water-gas shift reaction, comprising contacting the catalyst of claim 6, with a synthesis gas containing between 5 to 30% v/v of CO, a vapor/dry gas ratio between 0.05 to 0.6 mol/mol, a reactor inlet temperature between 280° C. to 400° C., a reactor outlet temperature between 380° C. to 500° C. and an operating pressure in the range of 10 to 40 $kgf/cm^2$.

8. Process, according to claim 7, wherein the synthesis gas contains between 8 to 20% v/v of CO, a vapor/dry gas ratio between 0.1 to 0.3 mol/mol, an inlet temperature in the reactor between 300° C. to 350° C. and a reactor outlet temperature between 400° C. to 450° C. and an operating pressure in the reactor in the range of 20 to 30 $kgf/cm^2$.

9. Process, according to claim 7, wherein the water-gas shift reaction takes place in a fixed bed reactor containing two regions, wherein a first region comprises up to 40% v/v of the catalyst consisting of alumina containing potassium, and zinc and copper oxides promoted by nickel and a second region comprises a catalyst consisting of alumina containing potassium, and zinc and copper oxides.

10. Method for preparing high temperature gas shifting catalyst, wherein comprising the following steps:
    f) Impregnating an alumina support with an aqueous solution of a potassium salt;
    g) Drying the support to remove the solvent and calcine the support at temperatures between 400° C. and 800° C. to obtain a potassium promoted alumina, preferably forming potassium aluminate species;
    h) Impregnating the potassium promoted alumina with an aqueous polar solution containing a soluble zinc salt and a soluble copper salt;
    i) Drying at a temperature between 80° C. and 120° C., and calcining the material at temperatures between 300° C. and 500° C., to obtain a catalyst consisting of alumina promoted with potassium and containing zinc and copper oxides.

11. Catalysts, according to claim 10, wherein having a specific area greater than 60 $m^2/g$, a potassium content between 3 to 10% m/m, zinc oxide content between 5 to 30% m/m, copper oxide content between 1 to 4% m/m, a Zn/Al molar ratio less than 0.4 based on the weight of the catalyst.

12. Process for reducing carbon monoxide, by the water-gas shift reaction, comprising contacting the catalyst of claim 11 with a synthesis gas containing between 5 to 30% v/v of CO, a vapor/dry gas ratio between 0.05 to 0.6 mol/mol, a reactor inlet temperature between 280° C. to 400° C., a reactor outlet temperature between 380° C. to 500° C. and an operating pressure in the range of 10 to 40 $kgf/cm^2$.

* * * * *